Patented Sept. 7, 1954

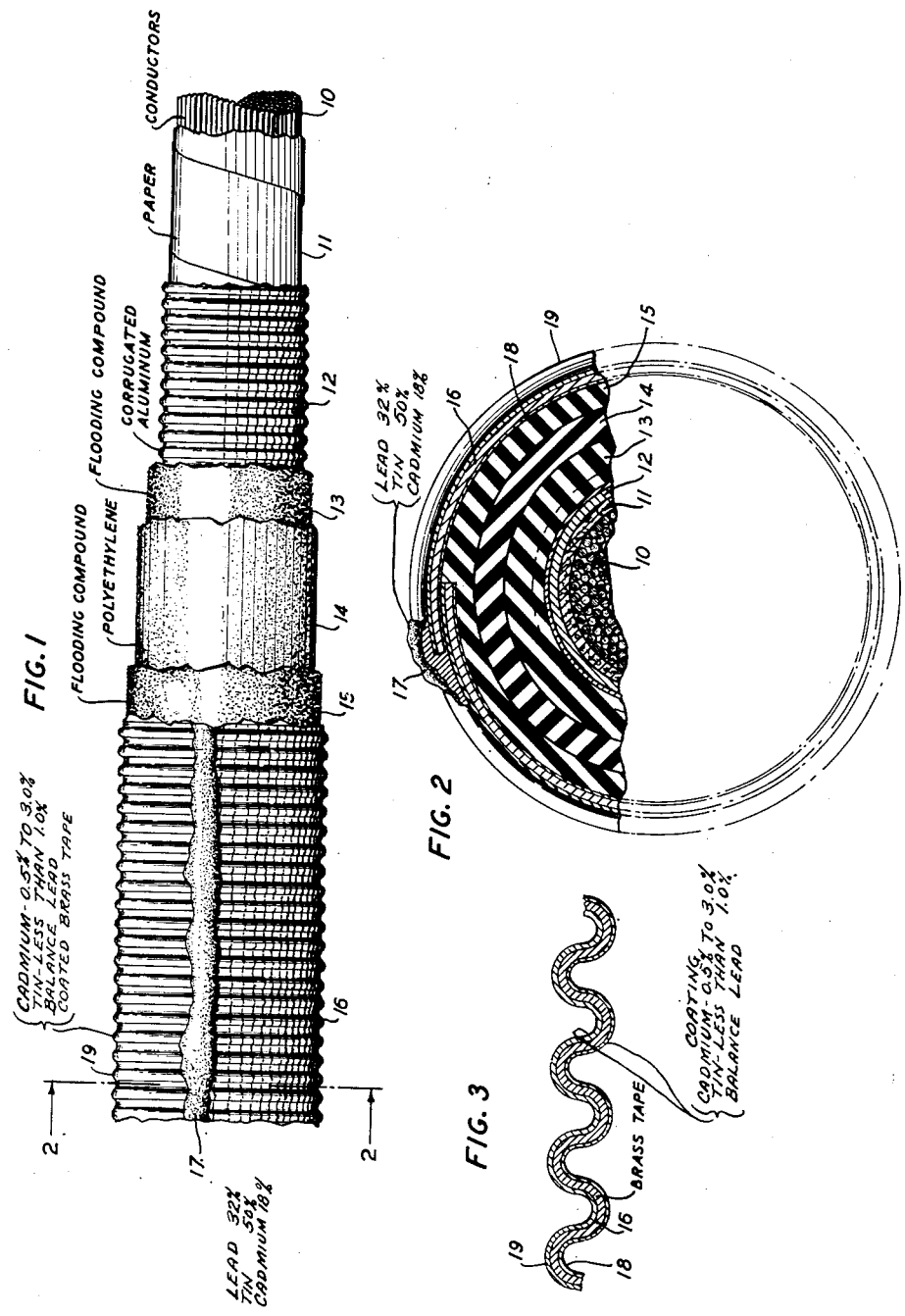

2,688,652

UNITED STATES PATENT OFFICE 2,688,652

LEAD CADMIUM COATED SOLDERED BRASS CABLE ARMOR

Earle E. Schumacher, Maplewood, N. J., assignor to Bell Telephone Laboratories, Incorporated, New York, N. Y., a corporation of New York Application November 17, 1949, Serial No. 127,821

3 Claims. (Cl. 174—102)

This invention relates to electrical cables and more particularly to flexible sheathed electrical cables particularly suitable for transmitting intelligence electrically.

One object of the invention is to provide an improved outer flexible, moisture-proof metallic sheathing for electrical communication cables.

Multiconductor cables particularly those intended for installation out of doors either suspended in open air on a supporting strand or installed in underground conduit, have generally been made with a seamless, moisture-proof and mechanical protective sheath of lead or suitable lead alloy extruded over the cable core.

In the past these sheaths have been generally satisfactory except for weight and bulk and in recent years the cost and scarcity of lead have been an incentive for the development of a lead sheath substitute. Consequently, attempts have been made to provide cables having sheaths of light, hard and thin materials such as copper, brass, aluminum and others applied over the cable core in the form of a transversely corrugated tape applied longitudinally about the core, with overlapping edges, to form a seam which must be sealed in such a manner as to be mechanically strong and to prevent the entrance of moisture.

It has been found that when the outer corrugated tape is composed of brass, which has been tinned to facilitate the soldering of the seam, the tin layer accelerates the corrosion of the brass tape and that at the soldered junction severe corrosion pits result. It has been found that these severe corrosion pits are directly associated with the copper-tin phase formed during the soldering operation.

It has been found that by coating the surfaces of the brass tape with a layer of a tin-free alloy, for example, lead-cadmium, the brass is protected from corrosion and also that such coating prevents couple-type corrosion between the brass and galvanized cable rings which are used to support the cable in some instances. The use of a lead alloy coating on the brass tape also prevents contact between tin and brass during the soldering of the longitudinal seam in the cable, thereby to prevent the formation of the copper-tin $\epsilon$-phase which is responsible for the heretofore referred to corrosion pit.

In one embodiment of the invention, as hereinafter illustrated and described, a flexible cable is constructed by forming a core of a plurality of paper-insulated conductors, covering the core with a layer of paper tape, forming a metallic tape having transverse corrugations, over the conductor group with the edges of the tape overlapping and longitudinal to the conductor, applying a flooding compound, such as asphalt, over the tape, extruding a layer of a suitable thermoplastic, for example polyethylene, over the flooding compound, applying a second layer of flooding compound over the polyethylene and finally forming a brass tape having its surfaces coated with a lead alloy, for example lead-cadmium, and provided with transverse corrugations, over the second layer of flooding compound with the edges of the tape longitudinal with respect to the conductor and having their overlapping edges soldered togethehr with a lead solder, particularly advantageously the eutectic alloy of lead, cadmium and tin, viz., 32% lead, 18% cadmium and 50% tin.

The invention will be more clearly understood from the following detailed description when read in conjunction with the following drawings in which:

Fig. 1 represents a fragment of a cable embodying this invention;

Fig. 2 is a cross-sectional view taken on line 2—2 of Fig. 1; and

Fig. 3 is a longitudinal sectional view of a fragment of the outer sheath showing the coatings of lead alloy.

As shown in Figs. 1 and 2, the embodiment of the invention illustrated comprises a core 10 of paper-insulated conductors having a spiral wrapping of paper tape 11 therearound. A metal sheath 12, provided with transverse corrugations, is applied over the paper tape 11 longitudinal to the conductors in the core 10 and with the edges overlapping, and having a layer of flooding compound 13, for example asphalt, applied thereover. Over the flooding compound 13 is extruded a layer of suitable thermoplastic 14, for example polyethylene, which has a layer of flooding compound 15, such as asphalt, applied thereover. Applied over the flooding compound 15 is a transversely corrugated brass tape 16 having its surfaces coated with a suitable lead alloy 18 and 19, for example lead cadmium having less than 1 per cent tin therein. A particularly advantageous alloy composition is one containing of the order of 2 per cent cadmium, for example between 0.5 and 3.0 per cent, and the balance lead. The coating on the outer surface is in the order of .002 inch thick and on the inside surface in the order of .001 inch thick. The tape 16 is applied longitudinally with respect to the conductors in the core 10, with the edges overlapping, and are soldered together as shown at 17 to provide a longitudinal seam which is moisture-proof.

While there has been shown and described, the preferred embodiment of my invention, it is to be understood that various changes and modifications may be made therein without departing from the spirit of the invention and I am only limited by the scope of the appended claims.

What is claimed is:

1. A flexible cable having an outer moisture-proof sheathing of brass tape folded thereabout with overlapping soldered edges, the inner and outer surfaces of said tape coated with a lead cadmium alloy consisting of between 0.5 and 3.0% cadmium, less than 1.0% tin and the balance lead, the overlapping edges of the coated tape soldered together with a solder comprising 32% lead, 18% cadmium and 50% tin.

2. A cable comprising a core having at least one insulated conductor, a flexible moisture-proof sheathing completely encasing said core, said sheathing comprising a transversely corrugated brass tape folded longitudinally about the core with its edges overlapping, said tape coated on both sides with a lead cadmium alloy consisting of between 0.5 and 3.0% cadmium, less than 1.0% tin and the balance lead, the edges of said tape overlapping and hermetically sealed with a solder comprising 32% lead, 18% cadmium and 50% tin.

3. A cable comprising a core having at least one insulated conductor, a flexible moisture-proof sheathing completely encasing said core, said sheathing comprising a transversely corrugated brass tape folded about said core with overlapping edges, said tape coated on both sides with a lead cadmium alloy consisting of between 0.5 and 3.0% cadmium, less than 1.0% tin and the balance lead, the edges of the tape hermetically sealed with a solder comprising 32% lead, 18% cadmium and 50% tin, the coating on the outer surface of the tape being about .002 inch in thickness and the coating on the inner surface being about .001 inch in thickness.

References Cited in the file of this patent

UNITED STATES PATENTS

| Number | Name | Date |
|---|---|---|
| 1,301,688 | Gurevich et al. | Apr. 22, 1919 |
| 1,645,098 | Friedrich | Oct. 11, 1927 |
| 2,041,842 | Layton | May 26, 1936 |
| 2,121,942 | Barrett | June 28, 1938 |
| 2,216,435 | Eckel | Oct. 1, 1940 |
| 2,312,506 | Tomlinson et al. | Mar. 2, 1943 |
| 2,316,293 | Scott | Apr. 13, 1943 |
| 2,479,924 | Gillis | Aug. 23, 1949 |

FOREIGN PATENTS

| Number | Country | Date |
|---|---|---|
| 24,348 of 1908 | Great Britain | Sept. 30, 1909 |
| 42,095 | Norway | Nov. 2, 1925 |
| 272,320 | Great Britain | June 16, 1927 |

OTHER REFERENCES

"Metallurgy of White Metal Scrap and Residues," E. C. Thews, Van Nostrand Co., 1930, page 89. (Copy in Div. 3.)

Bell Labs Record, vol. XXVI, No. 11, Nov. 1948.